(12) United States Patent
Sun

(10) Patent No.: US 12,132,380 B2
(45) Date of Patent: Oct. 29, 2024

(54) AIR EXTRACTION AND HEAT DISSIPATION STRUCTURE FOR PAPER

(71) Applicant: DONGGUAN SUNTECH ELECTRONICS CO., LTD., Dongguan (CN)

(72) Inventor: Yicheng Sun, Dongguan (CN)

(73) Assignee: DONGGUAN SUNTECH ELECTRONICS CO., LTD., Dongguan (CN)

( * ) Notice: Subject to any disclaimer, the term of this patent is extended or adjusted under 35 U.S.C. 154(b) by 482 days.

(21) Appl. No.: 17/582,796

(22) Filed: Jan. 24, 2022

(65) Prior Publication Data

US 2023/0223820 A1 Jul. 13, 2023

(30) Foreign Application Priority Data

Jan. 11, 2022 (CN) .......................... 202220057864.7

(51) Int. Cl.
| | |
|---|---|
| *H02K 9/14* | (2006.01) |
| *B02C 18/24* | (2006.01) |
| *H02K 5/20* | (2006.01) |
| *B02C 18/00* | (2006.01) |

(52) U.S. Cl.
CPC .............. *H02K 9/14* (2013.01); *B02C 18/24* (2013.01); *H02K 5/20* (2013.01); *B02C 18/0007* (2013.01); *B02C 2018/0038* (2013.01)

(58) Field of Classification Search
CPC .......... H02K 5/207; H02K 9/04; H02K 7/116; H02K 9/26; B02C 18/186; B02C 18/148; B02C 23/24; B02C 2023/165
See application file for complete search history.

(56) References Cited

U.S. PATENT DOCUMENTS

| | | | |
|---|---|---|---|
| 2003/0136546 A1* | 7/2003 | Zhang ................... | H01L 23/467 257/E23.099 |
| 2006/0138261 A1* | 6/2006 | Ho ....................... | B02C 18/0007 241/100 |
| 2013/0113310 A1* | 5/2013 | Xu ....................... | B02C 18/0007 310/58 |

* cited by examiner

*Primary Examiner* — Leda T Pham
(74) *Attorney, Agent, or Firm* — Birchwood IP

(57) ABSTRACT

An air extraction and heat dissipation structure for paper shredders, wherein the outer wall of the main handle is inlaid with switch button, the right side of the handle is connected with the power cord hook, the end of the handle is fixed with the connecting rod, and the bottom end of the rod is connected with a main body. The motor is arranged on the inner side of the heat dissipation port, the end of the motor is connected with the dust suction device, at the lower left end of which the dust storage chamber is arranged, and a dust suction channel is fixed at the right end of the chamber. The bottom end of the channel is connected with rollers, the left side of the rollers is provided with a suction cup, and the surface of the suction cup is provided with a dust suction port for paper shredders.

7 Claims, 3 Drawing Sheets

AIR EXTRACTION AND HEAT DISSIPATION STRUCTURE FOR PAPER

CROSS-REFERENCE TO RELATED APPLICATIONS

This application claims the benefit and priority of Chinese patent application No. 202220057864.7, filed on Jan. 11, 2022, disclosure of which is hereby incorporated by reference in its entirety.

TECHNICAL FIELD

The present application relates to the technical field of heat dissipation of paper shredders, in particular to an air extraction and heat dissipation structure for paper shredders.

BACKGROUND

At present, office equipment products in China and abroad are developing rapidly. Paper shredders are widely for offices or residences. The demand is greatly increased, and most customers have higher and higher requirements for the practical performance of paper shredders. This paper shredder is mainly aimed at the domestic and foreign markets. The traditional paper shredder will generate heat due to the continuous operation of the motor, and the heat will cause the temperature fuse to activate the protection function, which will cause the shredder to stop working. Therefore, the traditional paper shredder will turn into a rest cooling state after working continuously for a few minutes, which cannot meet the requirements of users who need a lot of shredding.

The existing air-cooling structures on the market all fix the fan at the rear end of the motor. The air outlet window is relatively close to the air inlet window, which affects the heat dissipation system. For this reason, we propose an air extraction and heat dissipation structure for paper shredders.

SUMMARY

The purpose of this application is to provide an air extraction and heat dissipation structure for paper shredders, so as to solve the problem that the existing air-cooling structure proposed in the above background technology is to fix the fan at the rear end of the motor, the air outlet window and the air inlet window is relatively close, which affects the cooling system.

In order to achieve the above objectives, the present application adopts the following technical solutions: an air extraction and heat dissipation structure for paper shredders, comprising a paper shredder main body, wherein a motor is arranged inside the upper part of the paper shredder main body, and ventilation windows are arranged on the rear side of the paper shredder main body, one end of the motor is fitted and sleeved with a motor cover, and the inner side of the motor cover is provided with a sealing sponge, wherein a rubber sleeve is arranged on the left end of the motor cover, and an air guide hood is connected to the left end of the rubber sleeve, and a component mounting base is fixed on the upper end of the air guide hood, and a rubber gasket is placed on the surface of the component mounting base, and a turbo exhaust fan is arranged above the component mounting base, and the left and right sides of the turbo exhaust fan are provided with second screws, wherein first screws are inserted on both sides of the surface of the air guide hood, and air inlets are arranged at the other end of the motor, wherein an air outlet is provided on the outer side of the turbo exhaust fan.

Preferably, the motor is configured to connect with the motor cover through the first screws, and the external structure size of one end of the motor is configured to be consistent with the internal structure size of the motor cover.

Preferably, the diameter of the motor cover is configured to be consistent with the diameter of the air guide hood, and the motor cover is configured to connect with the air guide hood through the rubber sleeve.

Preferably, the motor cover, the motor and the air guide hood are configured to locate on the same straight line, and the horizontal central axis of the motor cover is configured to coincide with the horizontal central axis of the motor;

Preferably, the outer shape of the air inlets is configured to be rectangular, and the air inlets are annularly distributed with respect to the central axis of the motor;

Preferably, the turbo exhaust fan is configured to connect with the component mounting base through the second screws, and the turbo exhaust fan is configured to closely attach to the component mounting base through a sealing gasket.

Preferably, the inner diameter of the sealing sponge is configured to be consistent with the outer diameter of the motor.

Compared with the prior art, the beneficial effects of the present application are as follows:

1. The motor cover is fixed with the motor by using the first screw. With this structure, on the one hand, the motor cover can be fixed on the motor, and on the other hand, it can be installed by using screws, which is convenient for disassembly and assembly during maintenance.

2. By arranging a rubber sleeve, a soft connection is formed between the motor connected to the motor cover on one side and the turbo exhaust fan, which is beneficial to the heat dissipation of the motor in operation. The air guide hood is connected with the motor cover by the rubber sleeve. Since the air guide hood, the motor cover and the motor are all located on the same horizontal line, this installation structure can establish a set of ventilation mechanisms between the motor and the air guide hood under the connection of the rubber sleeve, so that the wind can flow from the motor. It passes through the inside and can be discharged with the air guide hood.

3. The air inlet is located at the rear of the motor, and several groups of air inlet channels are arranged at the rear of the motor, which can allow air to flow through the interior of the motor, effectively and quickly take away the internal heat of the motor, allowing the motor to cool down faster, which greatly improves the continuous working time of the motor. Two sets of ventilation windows are arranged on the rear side of the main body, and the two sets of ventilation windows are respectively arranged on the left and right sides of the shredder, and the distance between the ventilation windows is relatively far, which is beneficial to prevent the occurrence of mutual interference of airflow, thereby avoiding affecting the heat dissipation system.

1. Motor; 2. Ventilation window; 3. Motor cover; 4. Sealing sponge; 5. Rubber sleeve; 6. Turbo exhaust fan; 7. Air guide hood; 8. Paper shredder main body; 9. Air inlet; 10. Air outlet; 11. First screw; 12. Component mounting base; 13. Rubber gasket; 14. Second screw.

DETAILED DESCRIPTION

The technical solutions in the embodiments of the present application will be clearly and completely described below with reference to the drawings in the embodiments of the present application. Obviously, the described embodiments are only a part of the embodiments of the present application, rather than all the embodiments. Based on the embodiments in this application, all other embodiments obtained by those of ordinary skill in the art without creative efforts shall fall within the protection scope of this application.

Figure 1:
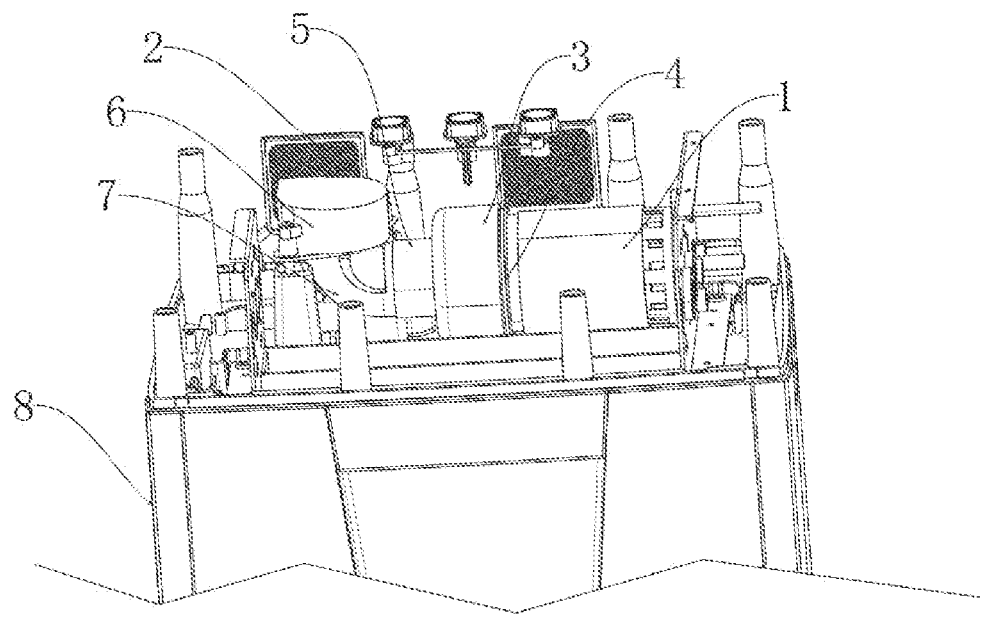
FIG. 1 is a schematic diagram of the overall structure of the application.
Figure 2:
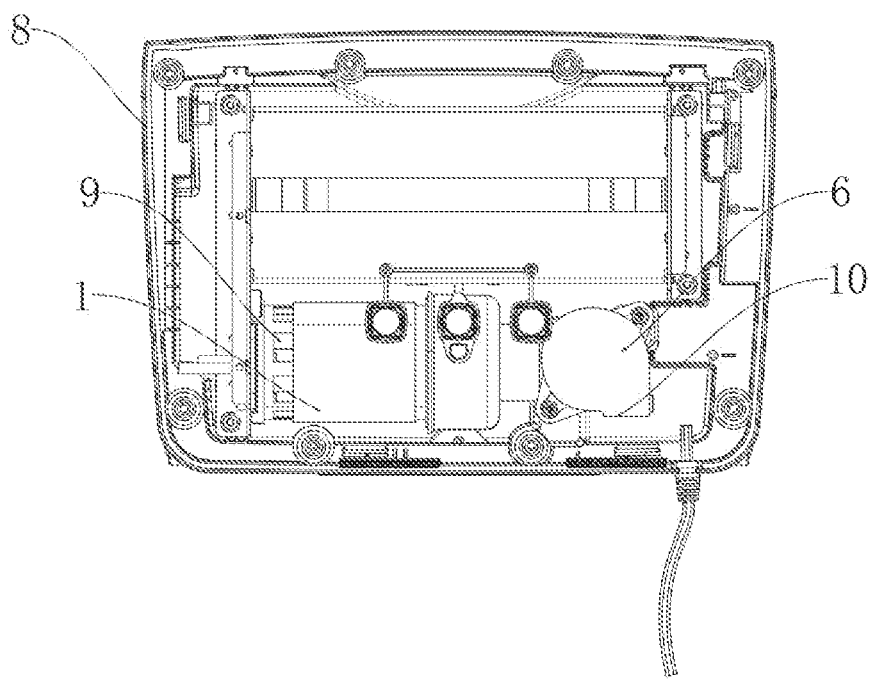
FIG. 2 is a schematic top-view structure diagram of the motor of the application.
Figure 3:
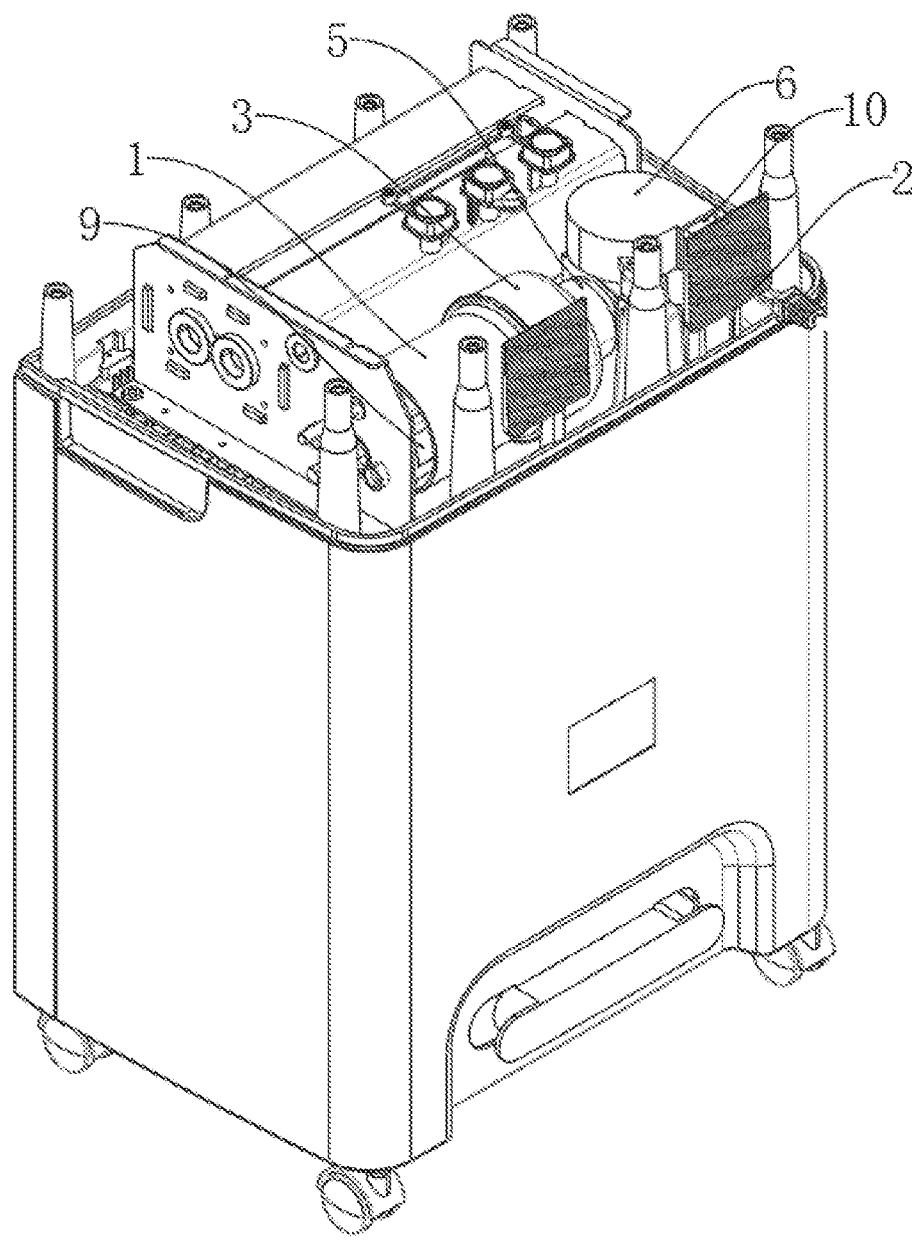
FIG. 3 is a left-view structural schematic diagram of the motor of the application.
Figure 4:
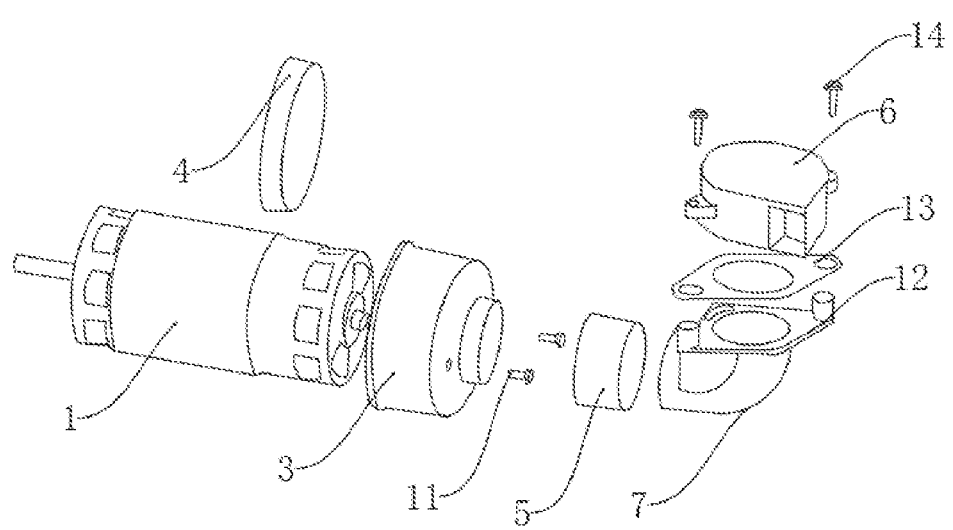
FIG. 4 is a schematic diagram of the exploded structure between the motor and the turbo exhaust fan of the present application.

Please refer to FIG. 1-FIG. 4, this application provides a technical solution: an air extraction and heat dissipation structure for paper shredders, comprising a paper shredder main body 8, wherein a motor 1 is arranged inside the upper part of the paper shredder main body 8, and ventilation windows 2 are arranged on the rear side of the paper shredder main body 8, one end of the motor 1 is fitted and sleeved with a motor cover 3, and the inner side of the motor cover 3 is provided with a sealing sponge 4, wherein a rubber sleeve 5 is arranged on the left end of the motor cover 3, and an air guide hood 7 is connected to the left end of the rubber sleeve 5, and a component mounting base 12 is fixed on the upper end of the air guide hood 7, and a rubber gasket 13 is placed on the surface of the component mounting base 12, and a turbo exhaust fan 6 is arranged above the component mounting base 12, and the left and right sides of the turbo exhaust fan 6 are provided with second screws 14, wherein first screws 11 are inserted on both sides of the surface of the air guide hood 7, and air inlets 9 are arranged at the other end of the motor 1, wherein an air outlet 10 is provided on the outer side of the turbo exhaust fan 6. Two sets of ventilation windows 2 are arranged on the rear side of the main body 8, and the two sets of ventilation windows 2 are respectively arranged on the left and right sides of the shredder, and the distance between the ventilation windows 2 is relatively far, which is beneficial to prevent the occurrence of mutual interference of airflow, thereby avoiding affecting the heat dissipation system.

In the present application, the motor 1 is configured to connect with the motor cover 3 through the first screws 11, and the external structure size of one end of the motor 1 is configured to be consistent with the internal structure size of the motor cover 3. The motor cover 3 is fixed with the motor 1 by using the first screw 11. With this structure, on the one hand, the motor cover 3 can be fixed on the motor 1, and on the other hand, it can be installed by using screws, which is convenient for disassembly and assembly during maintenance.

In the present application, the diameter of the motor cover 3 is configured to be consistent with the diameter of the air guide hood 7, and the motor cover 3 is configured to connect with the air guide hood 7 through the rubber sleeve 5. By arranging a rubber sleeve 5, a soft connection is formed between the motor 1 connected to the motor cover 3 on one side and the turbo exhaust fan 6, which is beneficial to the heat dissipation of the motor 1 in operation.

In the present application, the motor cover 3, the motor 1 and the air guide hood 7 are configured to locate on the same straight line, and the horizontal central axis of the motor cover 3 is configured to coincide with the horizontal central axis of the motor 1. The air guide hood 7 is connected with the motor cover 3 by the rubber sleeve 5. Since the air guide hood 7, the motor cover 3 and the motor 1 are all located on the same horizontal line, this installation structure can establish a set of ventilation mechanisms between the motor 1 and the air guide hood 7 under the connection of the rubber sleeve 5, so that the wind can flow from the motor 1. It passes through the inside and can be discharged with the air guide hood 7.

In the present application, the outer shape of the air inlets 9 is configured to be rectangular, and the air inlets 9 are annularly distributed with respect to the central axis of the motor 1. The air inlet 9 is located at the rear of the motor 1, and several groups of air inlet channels are arranged at the rear of the motor 1, which can allow air to flow through the interior of the motor 1, and can effectively and quickly take away the internal heat of the motor 1, allowing the motor 1 to cool down faster, greatly improving the continuous working time of the motor 1.

In the present application, the turbo exhaust fan 6 is configured to connect with the component mounting base 12 through the second screws 14, and the turbo exhaust fan 6 is configured to closely attach to the component mounting base 12 through a sealing gasket. By arranging the turbo exhaust fan 6, the air flowing inside the motor 1 can be drawn out through the air outlet 10, the internal air flow speed can be accelerated, the air circulation inside the main body 8 can be strengthened, the heat dissipation can be accelerated, and the main body 8 can complete a large amount of continuous shredding work. By arranging the gasket, the sealing performance can be strengthened which makes the ventilation and heat dissipation effect better.

In the present application, the inner diameter of the sealing sponge 4 is configured to be consistent with the outer diameter of the motor 1. By arranging the sealing sponge, the fit between the installation cover of the motor 1 and the motor 1 can be enhanced, and the sealing performance of the connection between the two can be enhanced, so as to avoid affecting the heat dissipation system.

Working principle: For this kind of air extraction and heat dissipation structure for paper shredders, first of all, two sets of ventilation windows 2 are arranged on the rear side of the paper shredder main body 8, one set belongs to the air outlet window, and the other set belongs to the air inlet window. When the motor 1 is working, the air will enter the interior of the main body 8 through the air inlet window, and enter from the air inlet 9 at the rear of the motor 1. The air enters the inside of the motor 1 through the air inlet 9 and flows inside the motor 1. By arranging a rubber sleeve 5, a soft connection is formed between the motor 1 connected to the motor cover 3 on one side and the turbo exhaust fan 6. The motor cover 3, the motor 1 and the air guide hood 7 are located on the same straight line. This installation structure can establish a set of ventilation mechanisms between the motor 1 and the air guide hood 7 under the connection of the rubber sleeve 5, so that the wind can flow from the motor 1. After that, under the action of the turbo exhaust fan 6, the wind will quickly flow from the air inlet 9 of the motor 1 to the air guide hood 7, and be discharged through the air guide hood 7 and the air outlet 10 on the turbo exhaust fan 6. This effectively dissipates heat for the motor 1 in operation, greatly improves the continuous working time of the motor 1, and thus completes the entire use process of an air extraction and heat dissipation structure for paper shredders.

It should be noted that, in this document, relational terms such as first and second are used only to distinguish one entity or operation from another entity or operation, but do not necessarily require or imply any such actual relationship or order between these entities or operations. The terms "including", "comprising" or any other variation thereof are intended to encompass non-exclusive inclusion such that a process, method, article or device comprising a list of elements includes not only those elements, but also other not expressly listed elements, or also include elements inherent to such a process, method, article or apparatus.

Although the embodiments of the present application have been shown and described, it will be understood by those skilled in the art that various changes, modifications, and substitutions can be made in these embodiments without departing from the principles and spirit of the present application and modifications, the scope of this application is defined by the appended claims and their equivalents.

What is claimed is:

1. An air extraction and heat dissipation structure for paper shredders, comprising a paper shredder main body, wherein a motor is arranged inside an upper part of the paper shredder main body, and ventilation windows are arranged on a rear side of the paper shredder main body, one end of the motor is fitted and sleeved with a motor cover, and an inner side of the motor cover is provided with a sealing sponge, wherein a rubber sleeve is arranged on a left end of the motor cover, and an air guide hood is connected to a left end of the rubber sleeve, and a component mounting base is fixed on an upper end of the air guide hood, and a rubber gasket is placed on a surface of the component mounting base, and a turbo exhaust fan is arranged above the component mounting base, and left and right sides of the turbo exhaust fan are provided with second screws, wherein first screws are inserted on both sides of a surface of the air guide hood, and air inlets are arranged at other end of the motor, wherein an air outlet is provided on an outer side of the turbo exhaust fan.

2. The air extraction and heat dissipation structure for paper shredders as recited in claim 1, wherein the motor is configured to connect with the motor cover through the first screws, and an external structure size of one end of the motor is configured to be consistent with an internal structure size of the motor cover.

3. The air extraction and heat dissipation structure for paper shredders as recited in claim 1, wherein a diameter of the motor cover is configured to be consistent with a diameter of the air guide hood, and the motor cover is configured to connect with the air guide hood through the rubber sleeve.

4. The air extraction and heat dissipation structure for paper shredders as recited in claim 1, wherein the motor cover, the motor and the air guide hood are configured to locate on the same straight line, and a horizontal central axis of the motor cover is configured to coincide with a horizontal central axis of the motor.

5. The air extraction and heat dissipation structure for paper shredders as recited in claim 1, wherein outer shapes of the air inlets are configured to be rectangular, and the air inlets are annularly distributed with respect to a central axis of the motor.

6. The air extraction and heat dissipation structure for paper shredders as recited in claim 1, wherein the turbo exhaust fan is configured to connect with the component mounting base through the second screws, and the turbo exhaust fan is configured to closely attach to the component mounting base through a sealing gasket.

7. The air extraction and heat dissipation structure for paper shredders as recited in claim 1, wherein an inner diameter of the sealing sponge is configured to be consistent with an outer diameter of the motor.

\* \* \* \* \*